US012580674B2

(12) United States Patent
Song et al.

(10) Patent No.: US 12,580,674 B2
(45) Date of Patent: Mar. 17, 2026

(54) FLEXIBLE FORWARDED CLOCKING ARCHITECTURE FOR DENSE WAVELENGTH DIVISION MULTIPLEXING SYSTEMS

(71) Applicant: NVIDIA Corp., Santa Clara, CA (US)

(72) Inventors: Sanquan Song, Los Altos Hills, CA (US); Nikola Nedovic, San Jose, CA (US); Thomas Hastings Greer, III, Chapel Hill, NC (US); Carl Thomas Gray, Apex, NC (US)

(73) Assignee: NVIDIA Corp., Santa Clara, CA (US)

( * ) Notice: Subject to any disclaimer, the term of this patent is extended or adjusted under 35 U.S.C. 154(b) by 354 days.

(21) Appl. No.: 18/392,452

(22) Filed: Dec. 21, 2023

(65) Prior Publication Data

US 2025/0211359 A1     Jun. 26, 2025

(51) Int. Cl.
*H04J 14/02* (2006.01)
*H04B 10/61* (2013.01)

(52) U.S. Cl.
CPC ...... *H04J 14/02862* (2023.08); *H04B 10/613* (2013.01); *H04J 14/0267* (2013.01)

(58) Field of Classification Search
None
See application file for complete search history.

(56) References Cited

U.S. PATENT DOCUMENTS

| | | | | |
|---|---|---|---|---|
| 10,404,262 B2 * | 9/2019 | Zerbe | | H03K 3/0315 |
| 10,903,841 B1 * | 1/2021 | Parvizi | | H03L 7/18 |
| 11,108,988 B2 * | 8/2021 | Masuda | | H04N 21/4424 |
| 11,341,067 B2 * | 5/2022 | Best | | G06F 3/061 |
| 11,356,107 B1 * | 6/2022 | Bhat | | H03L 7/085 |
| 11,533,057 B2 * | 12/2022 | Zhang | | H04B 1/38 |
| 11,579,361 B2 * | 2/2023 | Fini | | G02B 6/29335 |
| 11,586,579 B2 * | 2/2023 | Nassif | | G06F 15/17312 |
| 2008/0270818 A1 * | 10/2008 | Joordens | | G06F 1/10 |
| | | | | 713/500 |
| 2015/0089108 A1 * | 3/2015 | Wessel | | G06F 1/12 |
| | | | | 710/305 |

* cited by examiner

*Primary Examiner* — Jai M Lee
(74) *Attorney, Agent, or Firm* — Carnelian Law, LLC

(57) ABSTRACT

A dense wave division multiplex (DWDM) receiver includes receiver lanes each configured to detect signals encoded in a different electromagnetic frequency band. The DWDM receiver applies a clock signal received on a variable one of the receiver lanes to lock a frequency of an injection locked oscillator (ILO) of a clock distribution network, and receiver lanes that are configured to receive data signals generate resonance on the clock distribution network. The resonant signal from the clock distribution network is applied to sample the received data signals.

20 Claims, 18 Drawing Sheets

REF

PLL

DCC

510

FLEXIBLE FORWARDED CLOCKING ARCHITECTURE FOR DENSE WAVELENGTH DIVISION MULTIPLEXING SYSTEMS

BACKGROUND

Modern computer applications demand continued increases in data bandwidth in and out of data processing elements. For example, state-of-the-art artificial intelligence algorithms, such as the large language models, make high demands for throughput to and from the graphics processing units (GPUs) typically utilized to configure (i.e., 'train') these algorithms.

The electrical links utilized for this purpose are approaching practical and even theoretical limits on the bandwidth they can provide. However photonic links provide bandwidth scaling to higher rates than are achievable with conventional electrical link mechanisms. Dense wavelength division multiplexing (DWDM) is a photonic communication mechanism providing electronics-compatible data rates per optical wavelength and relatively high total bandwidth due to the large number of wavelengths utilized, such as 8, 16 or even 32.

DWDM systems may utilize one wavelength to forward the transmitter clock to the receiver to cancel correlated jitter effects. Correlated jitter is a timing distortion that arises from synchronization errors between the clocks in the transmitter and the receiver, resulting in timing uncertainty and potential data errors. In transceivers, signals need to be accurately transmitted and received within certain timing constraints. Any variation or distortion in the transmitted signal's timing can lead to errors in data transfer. Correlated jitter specifically refers to the timing uncertainty that is correlated or dependent on the characteristics of both the transmitter and the receiver. This jitter can arise from various sources such as noise, electromagnetic interference, temperature variations, and impedance mismatches. It can impact the performance and reliability of the transceiver system, especially in high-speed data transmission applications.

The system may utilize a fixed pairing of transmitter and receiver lanes. In this case the lane carrying the forwarded clock is fixed and there are no complications incurred to identify it at startup time. However, the discrepancies between the transmitter and receiver components in a given pairing of lanes may become so great (e.g., over time due to aging or other environmental or manufacturing factors) that tuning these components to bring them into alignment becomes impractical. For example, the energy needed to heat the optical resonant rings utilized to send and receive data on a particular data lane may become excessive or impractical.

Clock forwarding mechanisms such as a back channel between transmitter and receiver to identify the best lane for the forwarded clock, or large mux arrays in the receiver, may be challenging to implement.

Uncorrelated jitter is also a potential problem in high bandwidth transceivers. For example, the receiver may utilize a transimpedance amplifier (TIA) that induces uncorrelated jitter that contaminates the forwarded clock. The TIA induced uncorrelated jitter may arise due to thermal noise from the transistor components of the TIA.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
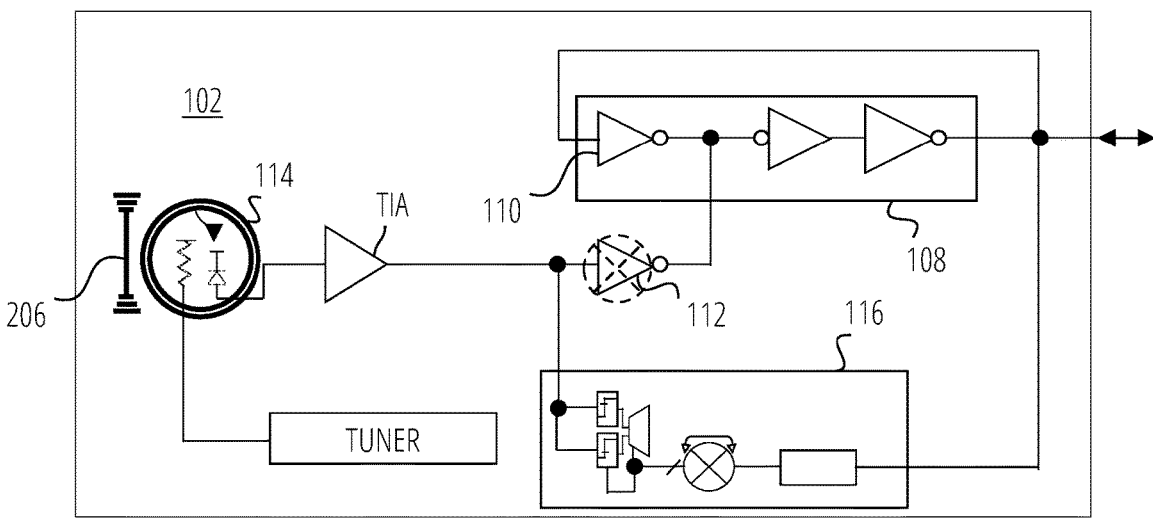
FIG. 1A depicts a lane receiver 102 configured in accordance with one embodiment.
Figure 1B:
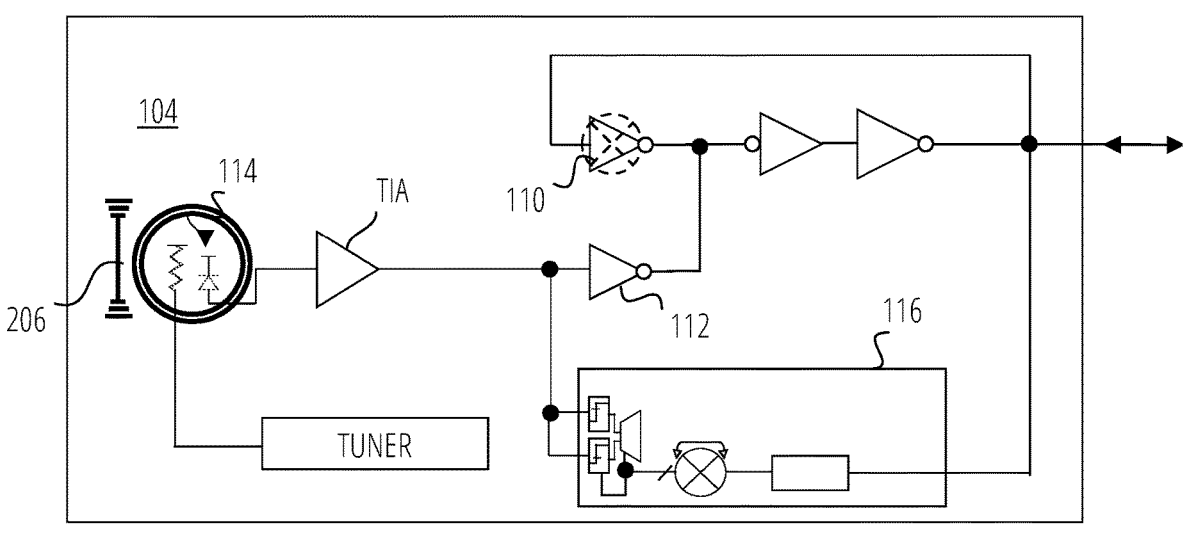
FIG. 1B depicts a lane receiver 104 configured in accordance with another embodiment.
Figure 1C:
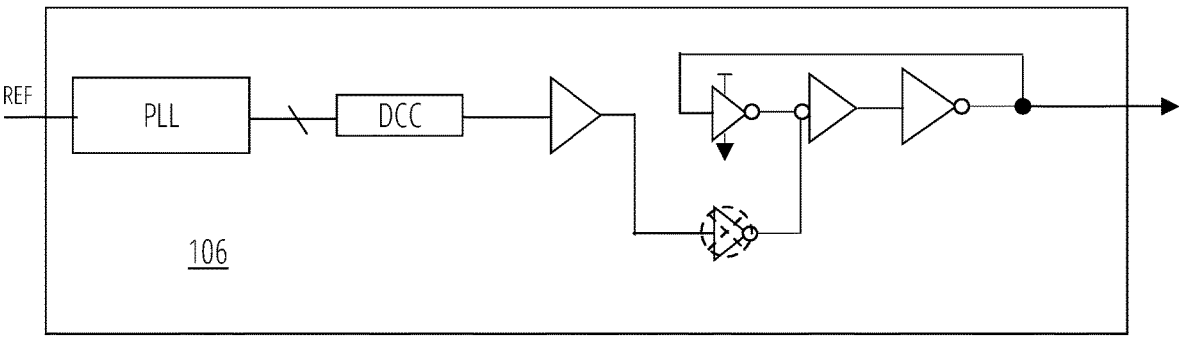
FIG. 1C depicts a receiver clock 106 configured in accordance with one embodiment.

Systems utilizing flexible forwarded clocking mechanisms for dense wavelength division multiplexing (DWDM) are disclosed. The forwarded clock may be transmitted on any wavelength, received by the paired receiver element without excessive heating, and distributed to other receiver lanes with jitter filtering. The forwarded clock signal is filtered to reduce uncorrelated jitter arising from, for example, TIA thermal noise. Additionally, the correlated jitter is tracked in order to improve the overall jitter performance.

The following description depicts DWDM receivers utilizing eight wavelengths to receive data signals, and one wavelength to receive a clock signal forwarded from the transmitter. The disclosed mechanisms are applicable to systems utilizing other numbers of wavelengths as well.

In one example, a phase-locked loop (PLL) of the transmitter generates a clock that is shared among identically-configured transmitter lanes, where one lane is used to transmit the forwarded clock (e.g., a 0101 signal pattern) and the remaining lanes are used to transmit the data stream. The transmitter senses the power of each wavelength, such as by monitoring the drop port power of a resonant optical ring utilized to transmit the data. The transmitter may select the lane with the strongest wavelength for communicating the forwarded clock signal (e.g., to reduce jitter effects). Alternatively, laser power of the receiver rings may be monitored and a desired wavelength for clock forwarding selected on that basis, with a backchannel utilized to communicate the receiver power information back to the transmitters.

The receiver may utilize a locally-generated clock during power-up initialization to identify the receiver land receiving the forwarded clock. For example, the receiver may utilize a frequency counter to identify the forwarded clock from other inputs, assuming the forwarded clock comprises a '0101' pattern at or around a certain frequency.

In the following example embodiments, the receiver-side phase interpolator-based de-skewing may instead be implemented in the transmitters. In these implementations the lane transmitters operate on a calibrated phase that aligns the data at the receiver such that each receiver lane may utilize a common clock signal to slice the received data. A backchannel may be utilized to communicate skew information from the receivers back to the transmitters.

In the drawings, certain circuit elements within receiver lanes, clocks, and so on are depicted as being disabled at particular points during operation (e.g., by opening a switch that supplies power to the disabled elements). These disabled circuit elements are indicated by superimposing a crossed circle over them in the larger circuit. Depending on the mode of the receiver's operation these elements may be enabled at some point. For example, certain driver elements within receiver lanes may be disabled during a mode when the receiver identifies the lane receiving the forwarded clock and establishes the injection-locked oscillator (ILO) clock distribution. These drivers may be re-enabled once the receiver enters data receiving mode. Likewise the circuit elements in particular lanes may be disabled or re-enabled based on which receiver lane is receiving the forwarded clock, and/or to increase or decrease the injection ratio.

Figure 2:
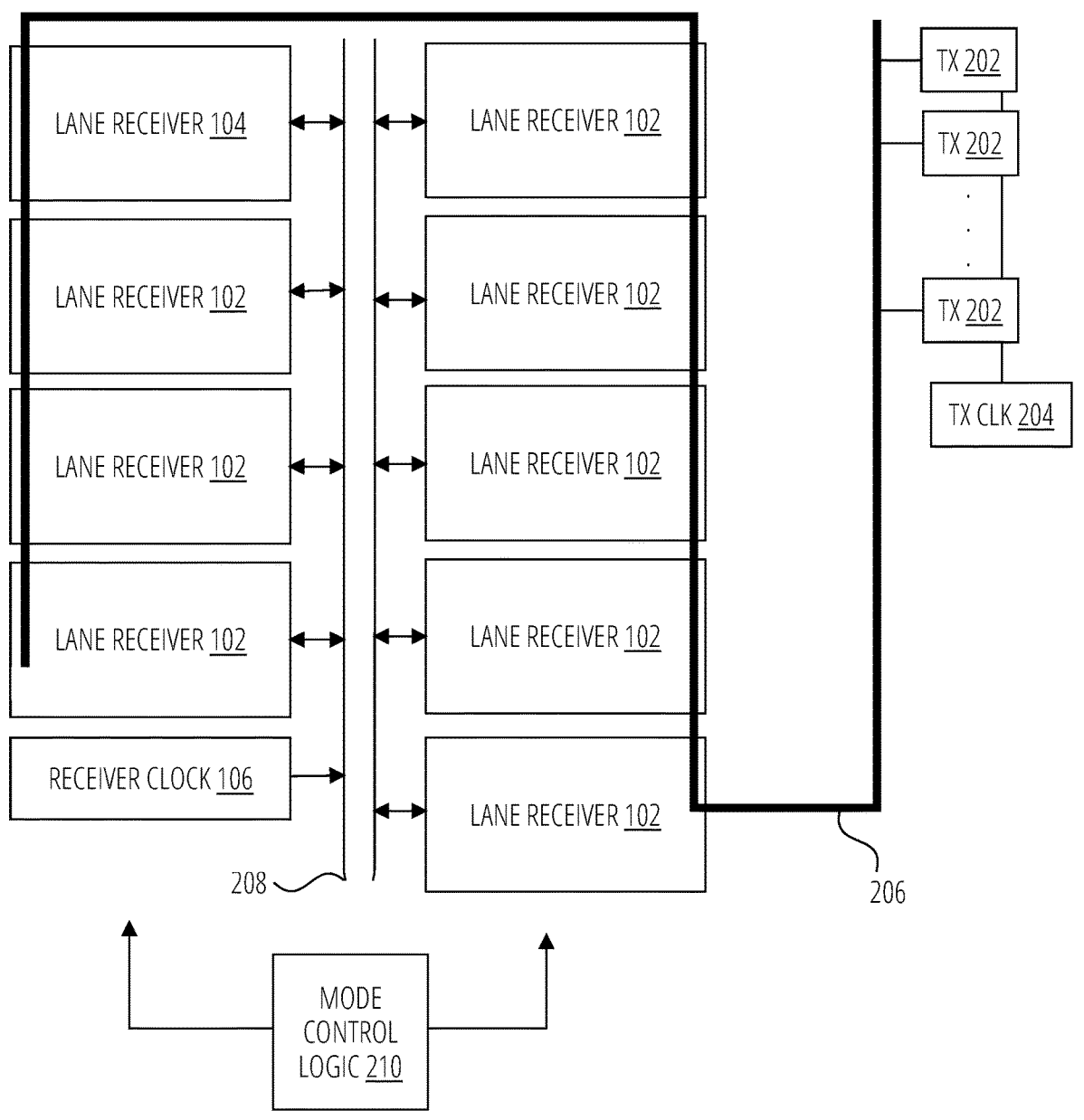
FIG. 2 depicts an embodiment of an optical receiver utilizing a single clock distribution line.
Figure 3:
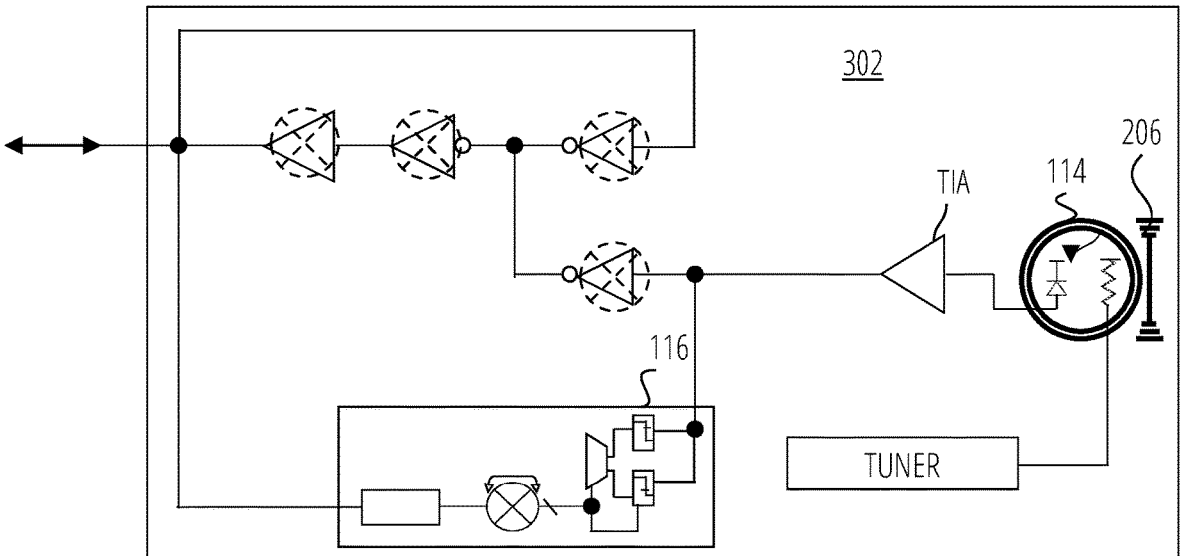
FIG. 3 depicts a lane receiver 302 configured in accordance with another embodiment.

FIG. 2 depicts an exemplary DWDM receiver implementing flexible lane (wavelength) selection for the forwarded clock. In the depicted example, lane receiver 104 receives the forwarded clock. Various lane transmitters 202 communicate data signals and forward the transmitter clock 204 over an optical fiber 206 to the receiver. The forwarded clock is applied at the receiver as the injection signal for an injection-locked oscillator (ILO) that drives a clock distribution network comprising, in this example, a clock distribution wire 208 (other embodiments may utilize more than a single clock distribution wire). The other lane receivers 102 resonate with the oscillations in the clock distribution wire 208, generating multiple clock phases.

An injection-locked oscillator (ILO) generates a natural (basic) oscillating signal. An input signal, herein referred to as the injection signal, is applied to the ILO to lock its frequency at a desired value. The injection signal may be a higher-power or higher-frequency signal than the oscillating signal generated by the oscillator. When the injection signal is applied, it exerts control over the natural frequency of the oscillator, causing it to synchronize and lock its oscillations to the frequency of the injection signal. As a result, the output signal of the injection-locked oscillator becomes locked to the frequency and phase of the injection signal.

Resonance of the driver chain 108 in the lane receivers 102 is inhibited by disabling the drivers 110 with the mode control logic 210. The mode control logic 210 reconfigures the driver chains 108 in the lane receivers 102 that receive data signals into oscillation by enabling drivers 110, forming the ILO-based clock distribution. The mode control logic 210 excludes data from the driver chain 108 of the lane receiving the forwarded clock by disabling the driver 112. In receiver lane 0 (lane receiver 104) where the forwarded clock is received, the output of the trans-impedance amplifier (TIA) is applied to a driver chain 108 to control and lock oscillation of the ILO. Lane receivers 102, 104 receive signals via their optical drop ports 114, and in lanes configured to receive data signals, the output of the TIA is applied to the data samplers 116.

In FIG. 2, the clock lane receiver 104 receives the forwarded clock and drives the clock distribution wire 208, which resonates with the eight data lane receivers 102 and clocks the data samplers 116 (which may comprise conventional phase-generator and post-deskew data slicing logic). In this embodiment, an ILO circuit for the receiver clock is formed having an injection ratio of 1:9, which determines the jitter tracking bandwidth. It is beneficial to tune the natural frequency of the clock distribution wire 208 to the operating frequency set by the receiver clock 106 to maximize the jitter tracking bandwidth. However, injection ratio tuning may be more effective at increasing the jitter tracking frequency. The receiver clock 106 may be implemented for example using a phase-locked loop (PLL) and digital counter circuit (DCC), in manners known in the art.

Figure 4:
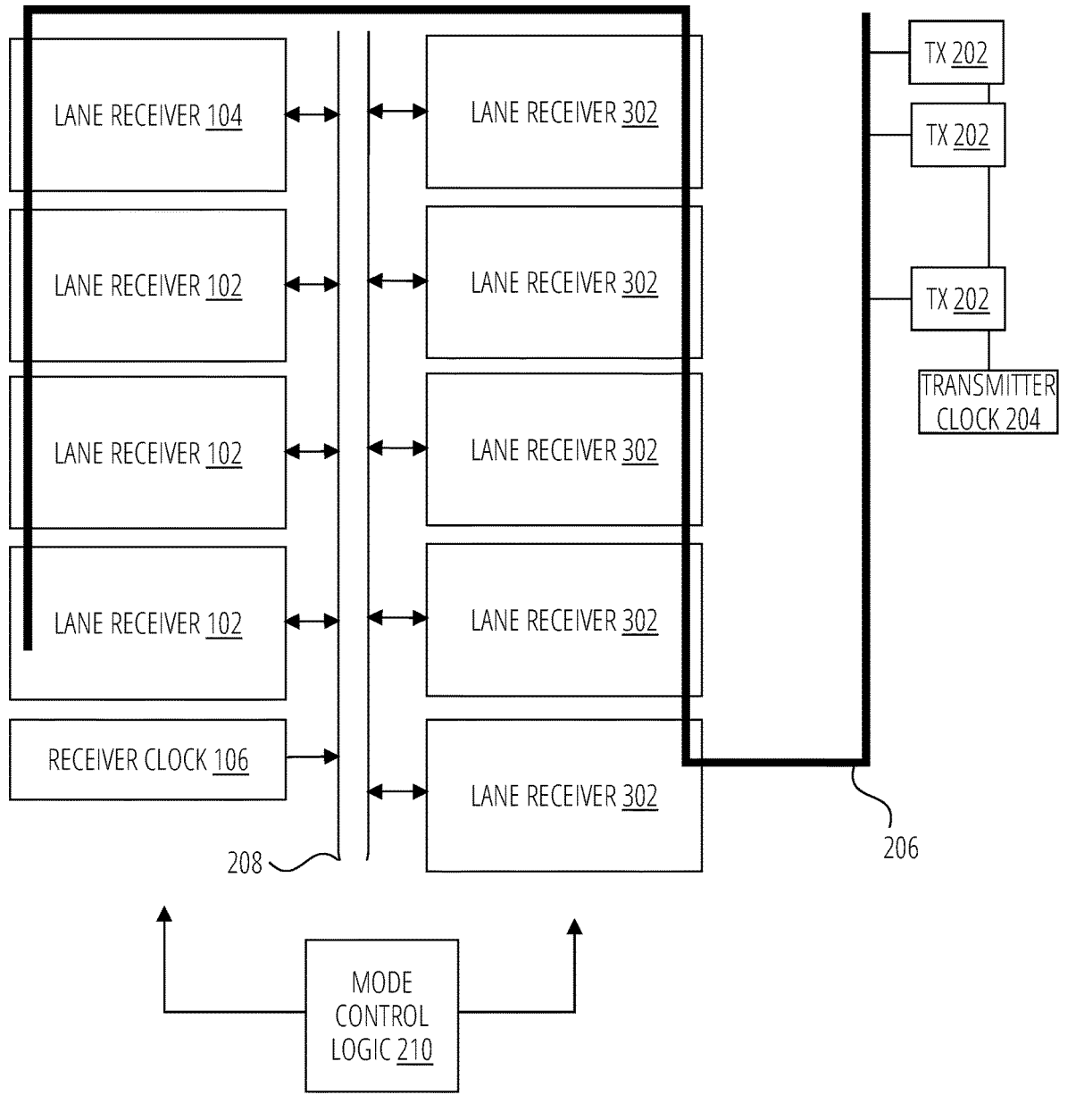
FIG. 4 depicts another embodiment of an optical receiver utilizing a single clock distribution line.
Figure 5A:
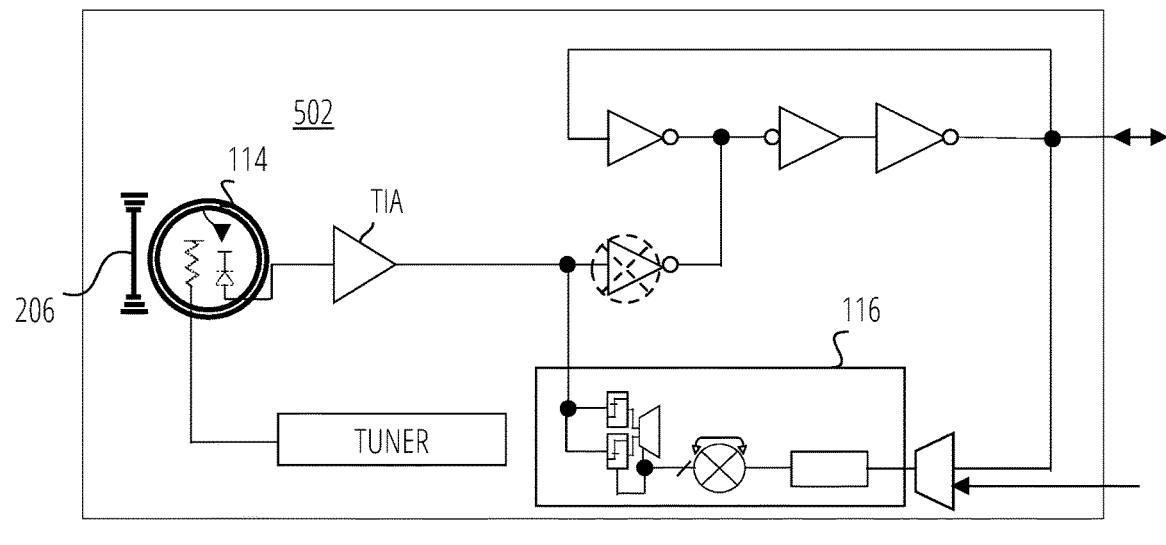
FIG. 5A depicts a lane receiver 502 configured in accordance with another embodiment.
Figure 5B:
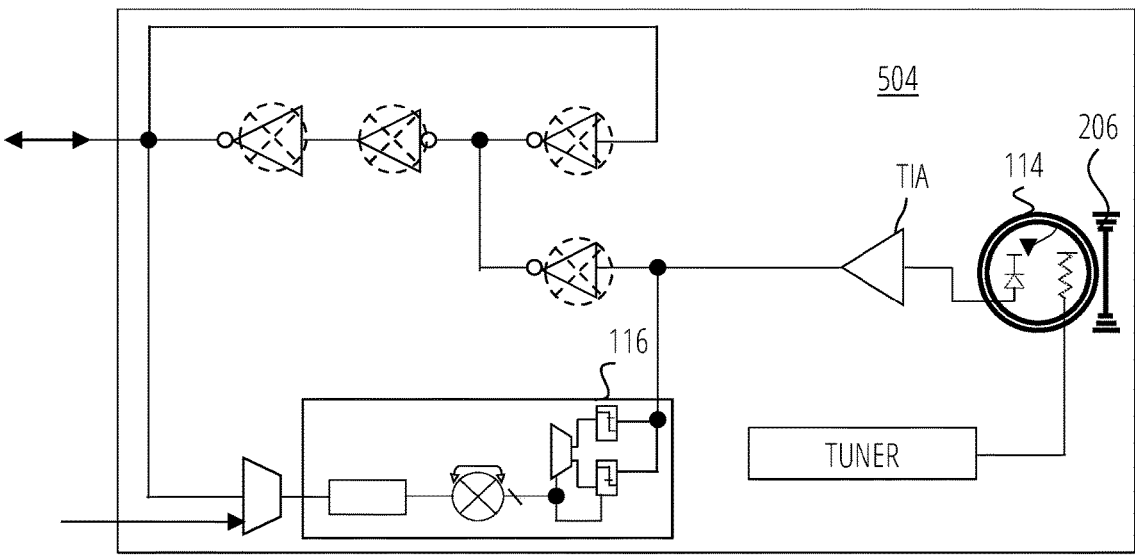
FIG. 5B depicts a lane receiver 504 configured in accordance with another embodiment.
Figure 5C:
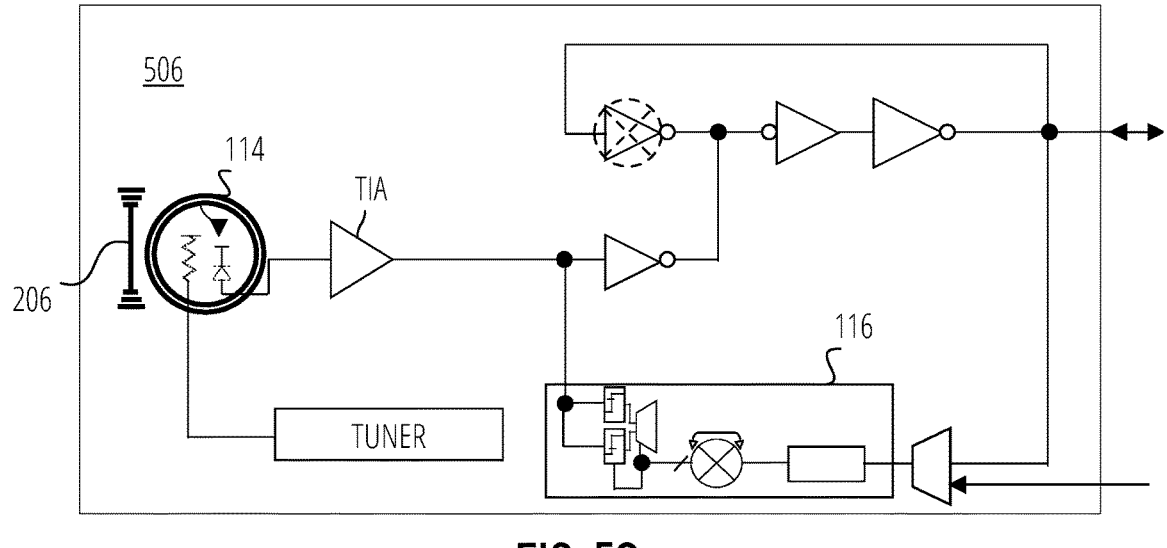
FIG. 5C depicts a lane receiver 506 configured in accordance with another embodiment.
Figure 5D:
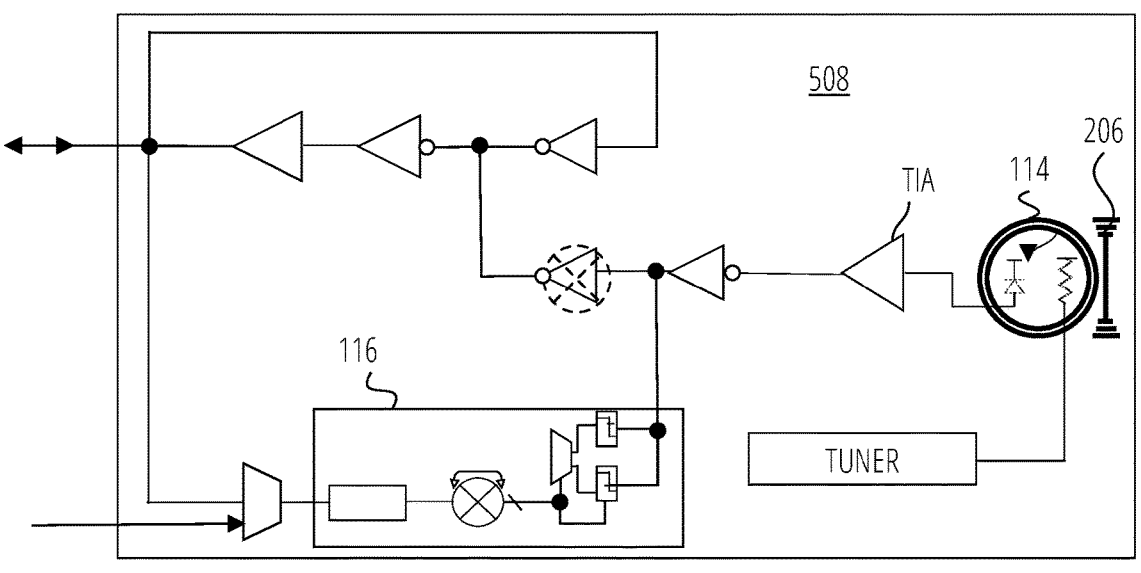
FIG. 5D depicts a lane receiver 508 configured in accordance with another embodiment.
Figure 5E:
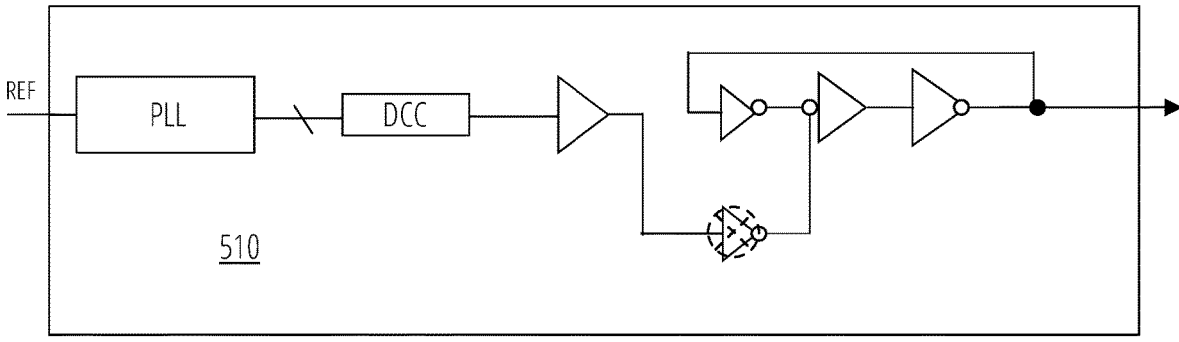
FIG. 5E depicts a receiver clock 510 configured in accordance with another embodiment.

FIG. 4 depicts an exemplary DWDM receiver implementing flexible lane (wavelength) selection for the forwarded clock, wherein injection ratio tuning is implemented by disabling the oscillators in the lane receivers 302. In the depicted example, five oscillators are disabled, improving the injection ratio to 1:4. The disabled oscillators in the lane receivers 302 provide a dead load to the clock distribution network (clock distribution wire 208), reducing its natural frequency.

Figure 6:
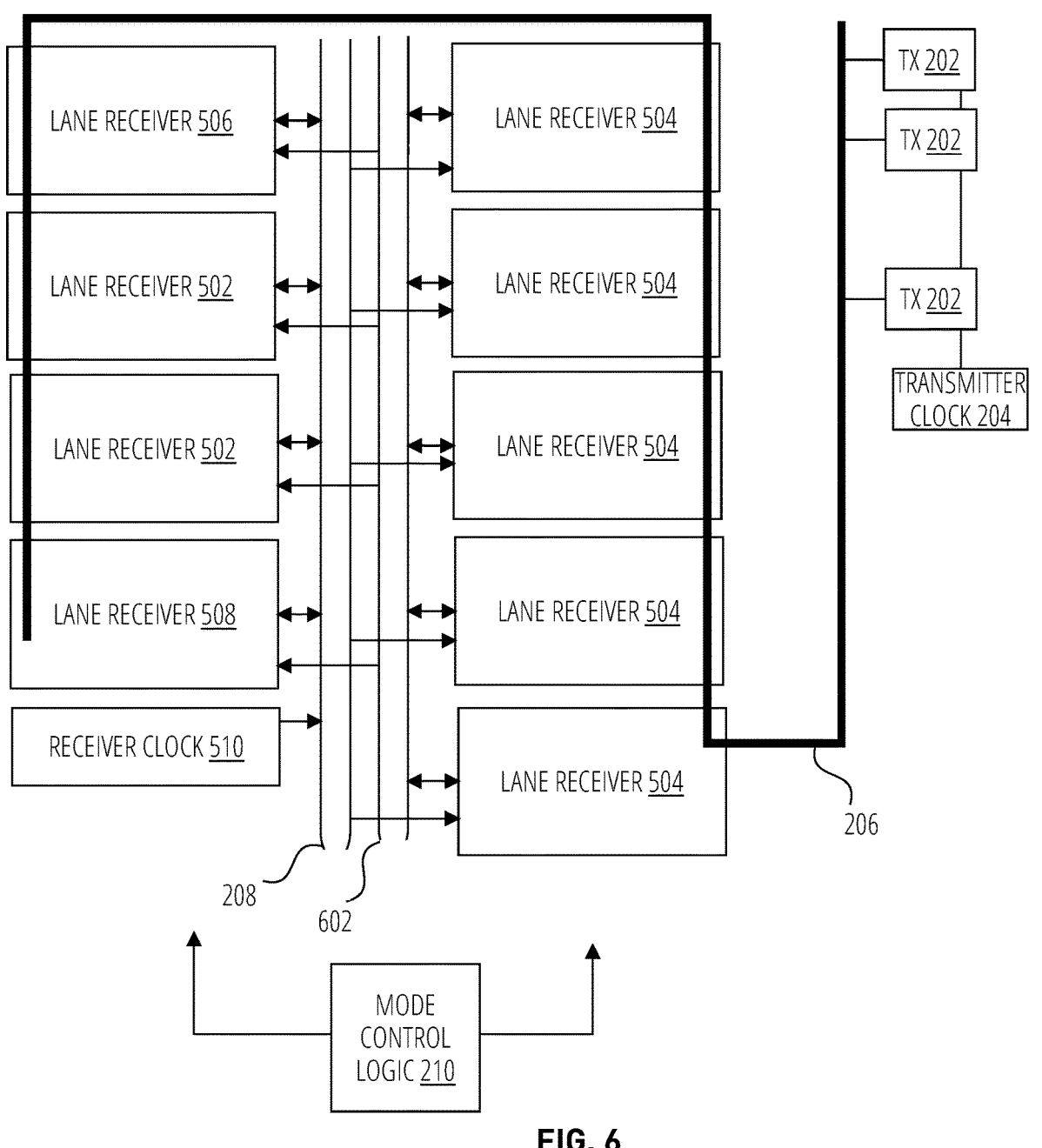
FIG. 6 depicts an embodiment of an optical receiver utilizing a pair of clock distribution lines.
Figures 7A, 7B:
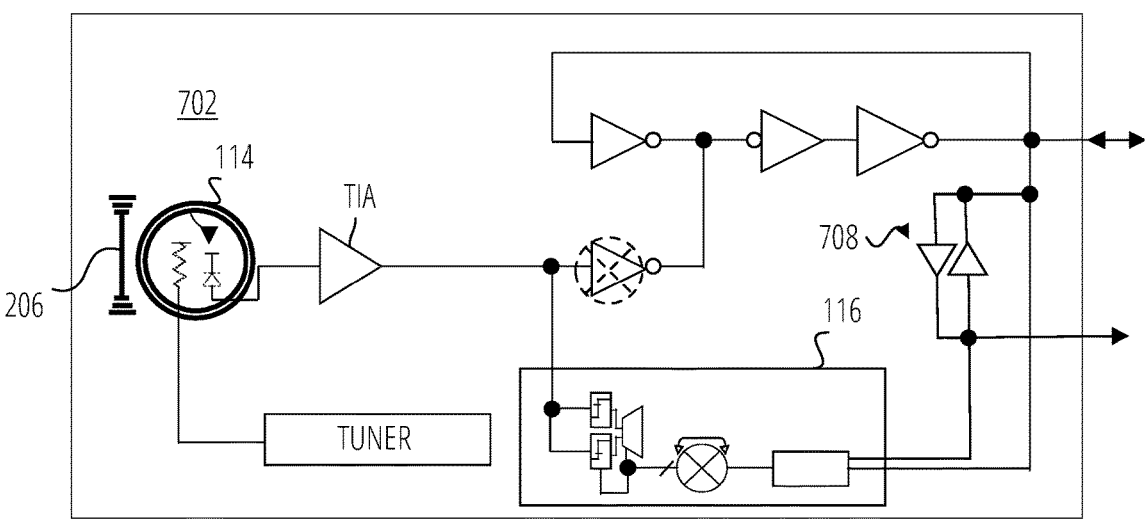
FIG. 7A depicts a lane receiver 702 configured in accordance with another embodiment.
FIG. 7B depicts a lane receiver 704 configured in accordance with another embodiment.
Figure 7C:
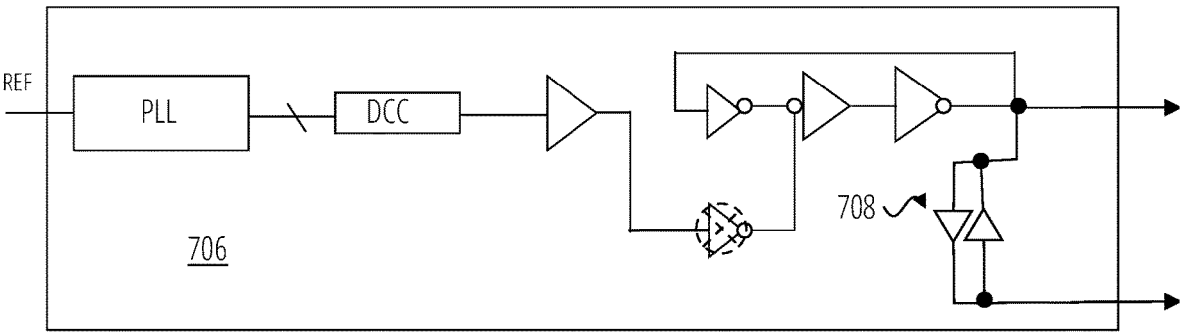
FIG. 7C depicts a receiver clock 706 configured in accordance with another embodiment.

To boost the injection strength without slowing down the natural frequency, the clock distribution network may be diversified into multiple paths, as depicted for example in FIG. 6. All of the lane receivers receive the receiver clock 510, but depending on whether the selected clock lane receiver 506 is coupled to the clock distribution wire 208 or the clock distribution wire 602, only certain data lane receivers are enabled. In the depicted example, the clock lane receiver 506 is coupled to clock distribution wire 208, and so the data lane receivers 504 coupled to the clock distribution wire 602 are disabled and the data lane receivers 502 and lane receiver 508 are enabled. In this manner the injection ratio is maintained at 1:4 without dead-loading the clock distribution wire 208 or lowering its natural frequency. The injection ratio may be increased further at the expense of some dead-loading and reduction of natural frequency by disabling some the oscillators in some of the data lane receivers, as explained in conjunction with FIG. 4.

Figure 8:
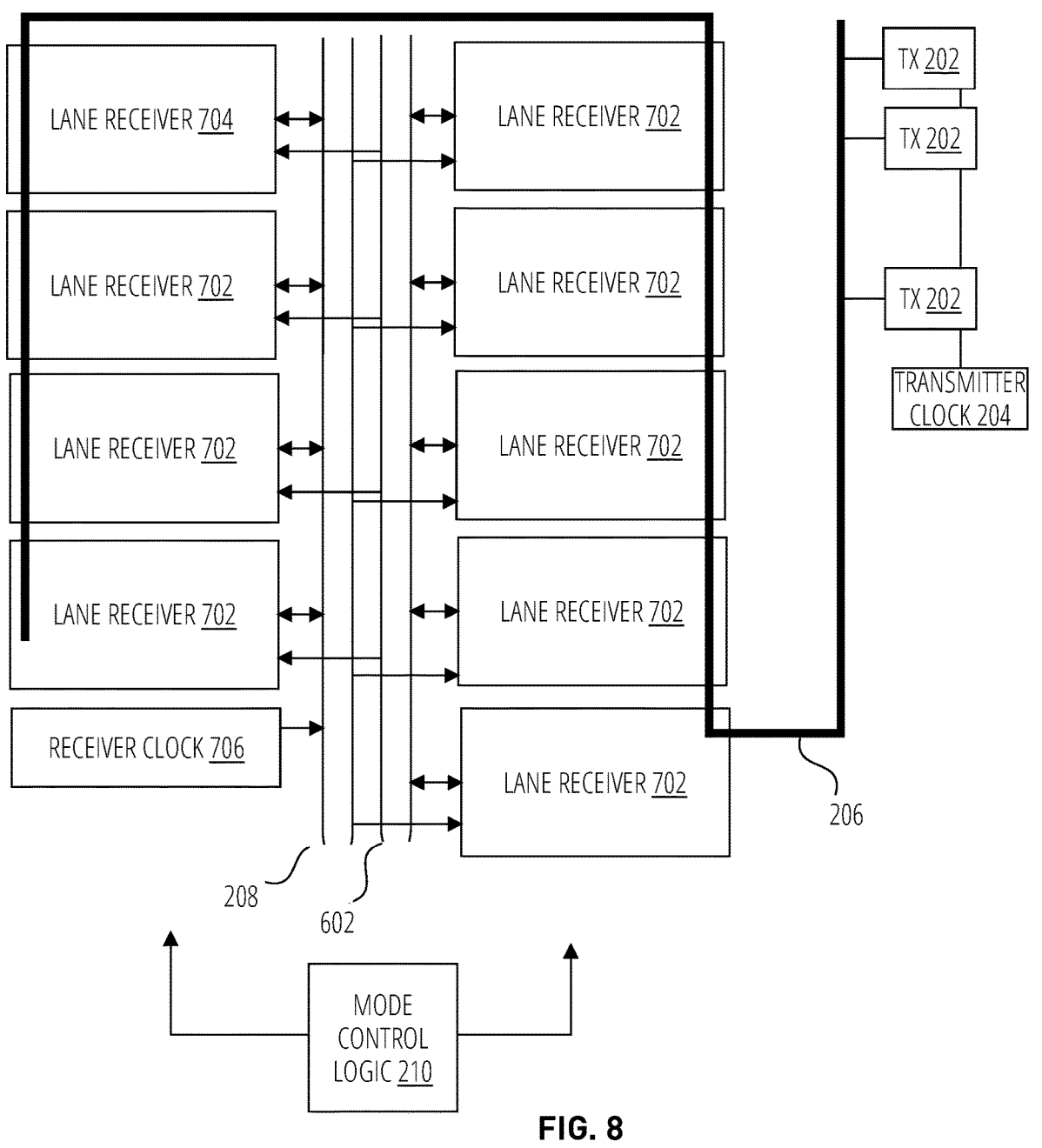
FIG. 8 depicts another embodiment of an optical receiver utilizing a pair of clock distribution lines.
Figure 9A:
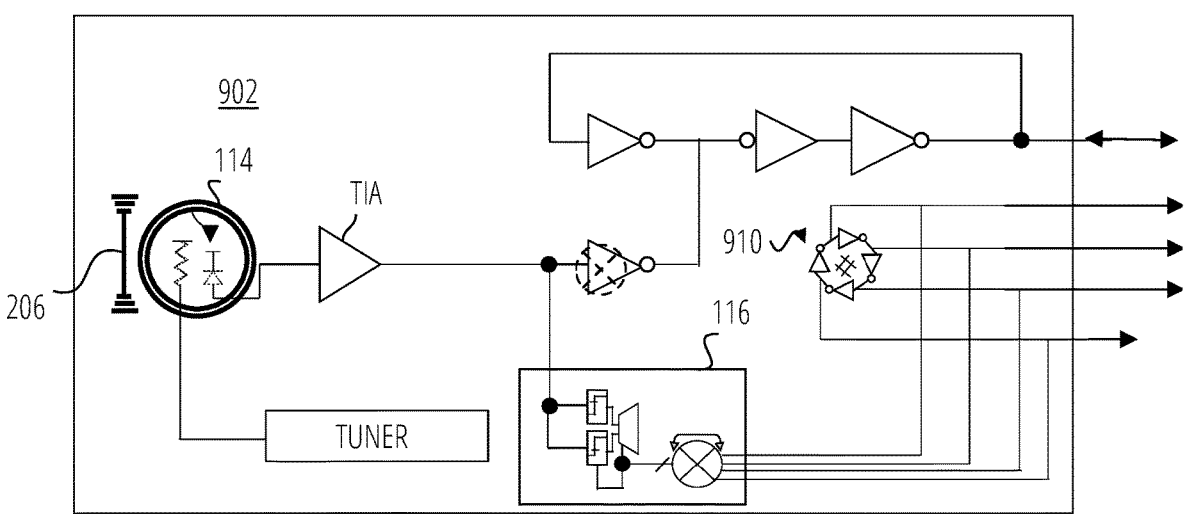
FIG. 9A depicts a lane receiver 902 configured in accordance with another embodiment.
Figure 9B:
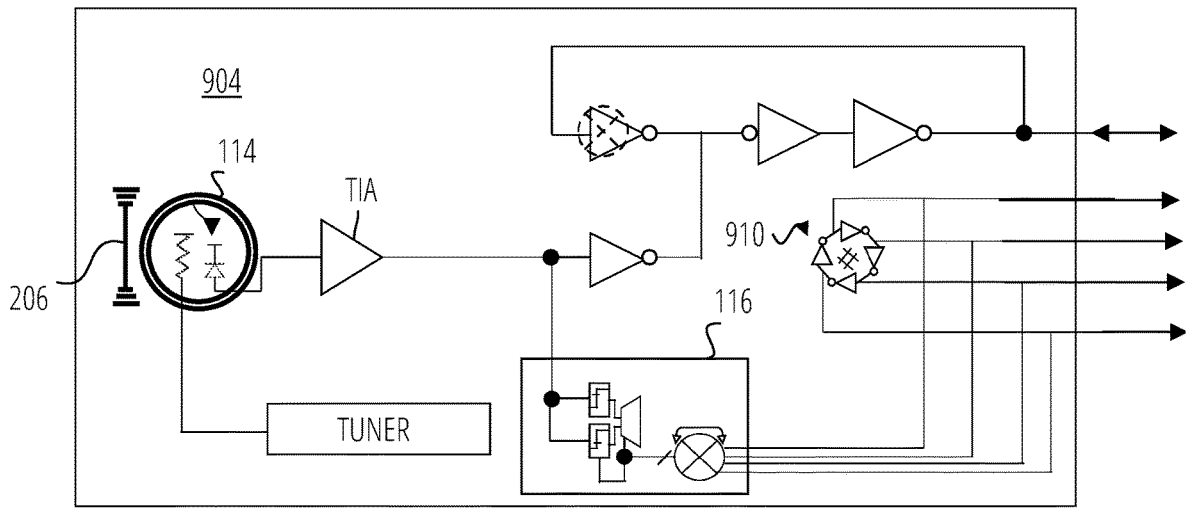
FIG. 9B depicts a lane receiver 904 configured in accordance with another embodiment.
Figure 9C:
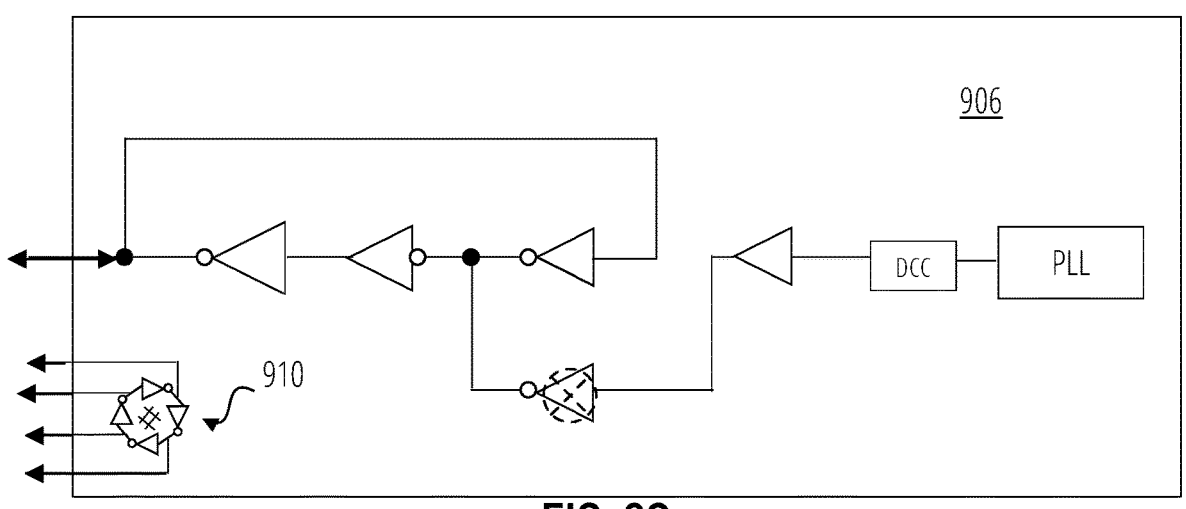
FIG. 9C depicts a receiver clock 906 configured in accordance with another embodiment.
Figure 9D:
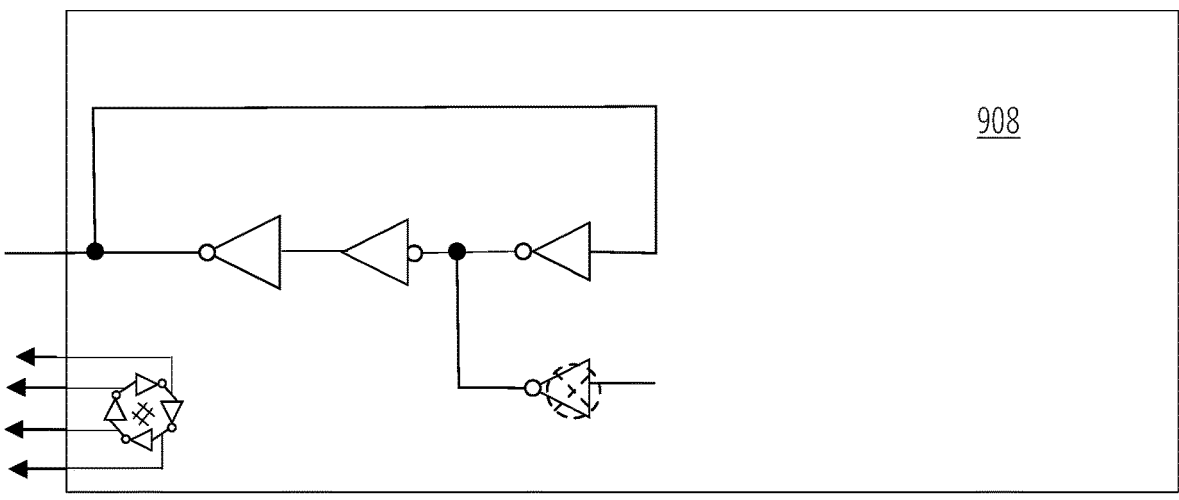
FIG. 9D depicts a dummy load 908 configured in accordance with another embodiment.

FIG. 8 depicts an exemplary DWDM receiver implementing flexible lane (wavelength) selection for the forwarded clock, wherein differential phase generation and distribution is enabled by adding differential phase generators 708 to, and enabling the oscillators in, the data lane receivers 702, the clock lane receiver 704, and the receiver clock 706.

IQ phase generation is a process of generating two separate signals, known as In-phase (I) and Quadrature-phase (Q) signals. These signals are widely used in various applications, such as wireless communication systems, signal processing, and radar systems. The generation of I and Q signals involves the use of quadrature modulation. Quadrature modulation is achieved by an IQ phase generator 910 that mixes a reference signal, typically a sinusoidal waveform, with another signal, such as a data signal. The reference signal is often generated by a local oscillator. The local oscillator produces two signals that are 90 degrees out of phase with each other. These signals are known as cosine (I) and sine (Q) signals. By multiplying the data signal with the cosine (I) and sine (Q) signals separately, two separate modulated signals, I and Q, are produced. The I and Q signals provide a way to represent both the amplitude and phase information of the original signal.

Figure 10:
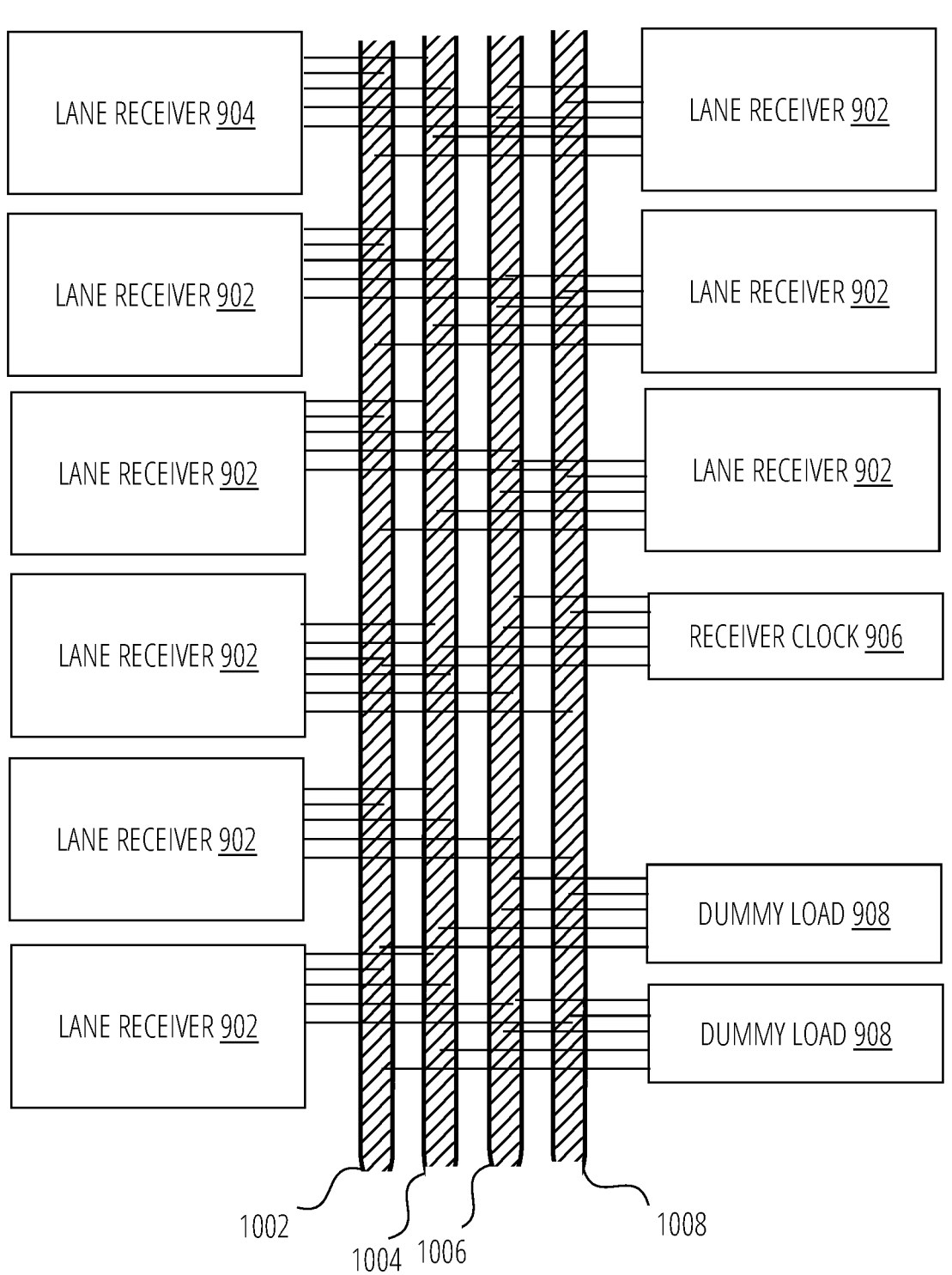
FIG. 10 depicts an embodiment of an optical receiver utilizing four clock distribution lines.

FIG. 10 depicts an exemplary DWDM receiver implementing flexible lane (wavelength) selection for the forwarded clock with IQ phase generation and distribution. Although not depicted, the transmitter and mode control elements depicted in other embodiments should be understood to be present.

The receiver clock 906, clock lane receiver 904, and various data lane receivers 902 are coupled to a four-wire clock distribution network (wires 1002, 1004, 1006, and 1008). The depicted embodiment advantageously avoids the use of local oscillators, which may exhibit unacceptable frequency variations. The additional dummy loads 908 enable the uniform four-way distribution of loading on the clock distribution network.

The optical receiver mechanisms disclosed herein may be utilized in computing devices utilizing one or more graphic processing unit (GPU) and/or general purpose data processor (e.g., a 'central processing unit or CPU). Exemplary architectures will now be described that may be configured with the mechanisms the techniques disclosed herein.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Figure 11:
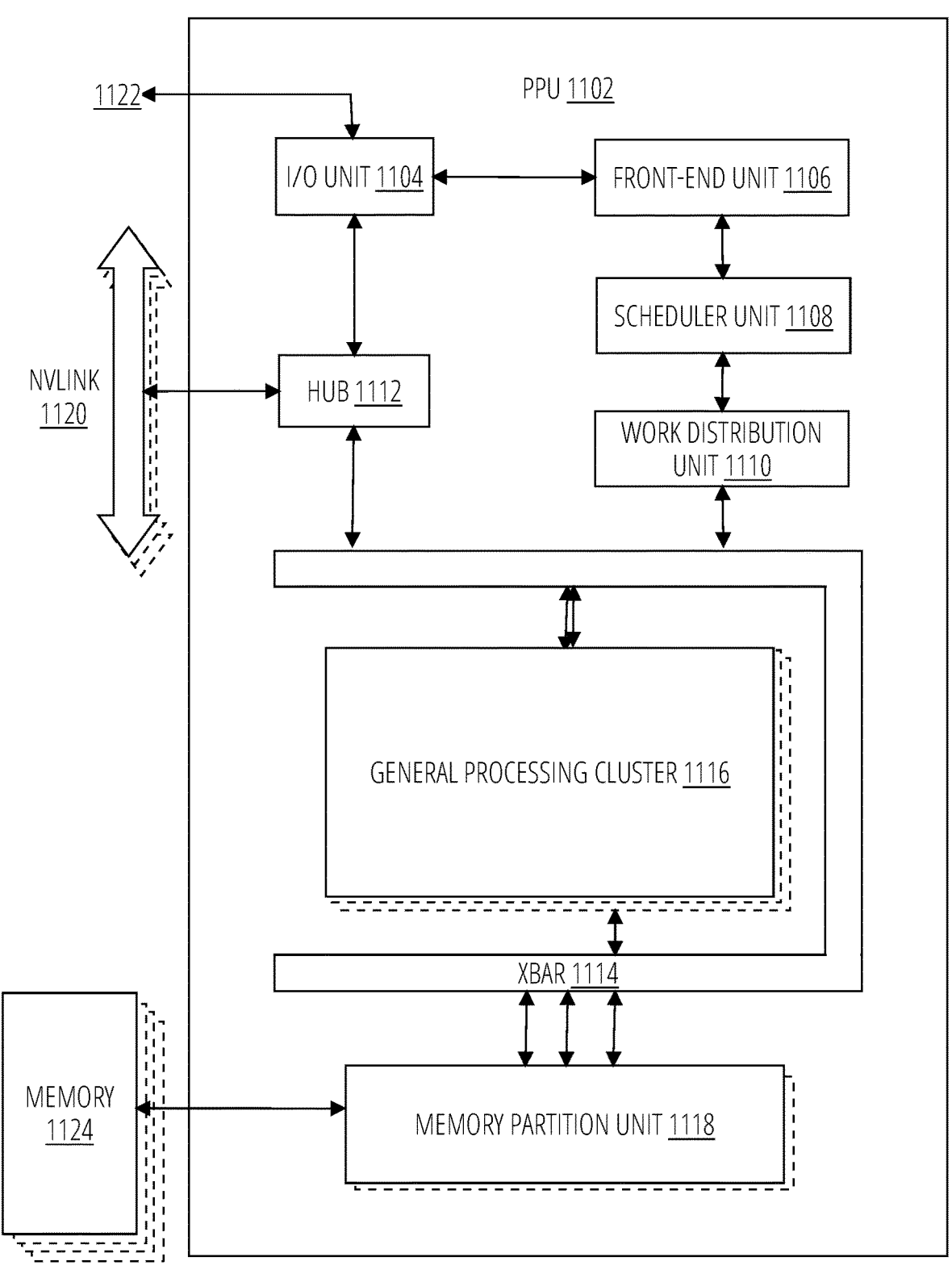
FIG. 11 depicts a parallel processing unit 1102 in accordance with one embodiment.

FIG. 11 depicts a parallel processing unit 1102, in accordance with an embodiment. In an embodiment, the parallel processing unit 1102 is a multi-threaded processor that is implemented on one or more integrated circuit devices. The parallel processing unit 1102 is a latency hiding architecture designed to process many threads in parallel. A thread (e.g., a thread of execution) is an instantiation of a set of instructions configured to be executed by the parallel processing unit 1102. In an embodiment, the parallel processing unit 1102 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1102 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1102 modules may be configured to accelerate thousands of High Performance Computing (HPC), data center, and machine learning applications. The parallel processing unit 1102 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 11, the parallel processing unit 1102 includes an I/O unit 1104, a front-end unit 1106, a scheduler unit 1108, a work distribution unit 1110, a hub 1112, a crossbar 1114, one or more general processing cluster 1116 modules, and one or more memory partition unit 1118 modules. The crossbar 1114 may be implemented for example using optical waveguides, and DWDM signals may be exchanged over these waveguides among the various components/units, which may utilize optical transmitters and receivers in accordance with the embodiments described herein.

The parallel processing unit 1102 may be connected to a host processor or other parallel processing unit 1102 modules via one or more high-speed NVLink 1120 interconnects. The parallel processing unit 1102 may be connected to a host processor or other peripheral devices via an interconnect 1122. The interconnects 1120 and 1122 may be optical waveguides configured with transmitters and receivers as disclosed herein. The parallel processing unit 1102 may also be connected to a local memory comprising a number of memory 1124 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1124 may comprise logic to configure the parallel processing unit 1102 to carry out aspects of the techniques disclosed herein.

The NVLink 1120 interconnect enables systems to scale and include one or more parallel processing unit 1102 modules combined with one or more CPUs, supports cache coherence between the parallel processing unit 1102 modules and CPUs, and CPU mastering. Data and/or commands may be transmitted by the NVLink 1120 through the hub 1112 to/from other units of the parallel processing unit 1102 such as one or more copy engines, a video encoder, a video decoder, a power management unit, etc. (not explicitly shown).

The I/O unit 1104 is configured to transmit and receive communications (e.g., commands, data, etc.) from a host processor (not shown) over the interconnect 1122. The I/O unit 1104 may communicate with the host processor directly via the interconnect 1122 or through one or more intermediate devices such as a memory bridge. In an embodiment, the I/O unit 1104 may communicate with one or more other processors, such as one or more parallel processing unit 1102 modules via the interconnect 1122. In an embodiment, the I/O unit 1104 implements a Peripheral Component Interconnect Express (PCIe) interface for communications over a PCIe bus and the interconnect 1122 is a PCIe bus. In alternative embodiments, the I/O unit 1104 may implement other types of well-known interfaces for communicating with external devices.

The I/O unit 1104 decodes packets received via the interconnect 1122. In an embodiment, the packets represent commands configured to cause the parallel processing unit 1102 to perform various operations. The I/O unit 1104 transmits the decoded commands to various other units of the parallel processing unit 1102 as the commands may specify. For example, some commands may be transmitted to the front-end unit 1106. Other commands may be transmitted to the hub 1112 or other units of the parallel processing unit 1102 such as one or more copy engines, a video encoder, a video decoder, a power management unit, etc. (not explicitly shown). In other words, the I/O unit 1104 is configured to route communications between and among the various logical units of the parallel processing unit 1102.

In an embodiment, a program executed by the host processor encodes a command stream in a buffer that provides workloads to the parallel processing unit 1102 for processing. A workload may comprise several instructions and data to be processed by those instructions. The buffer is a region in a memory that is accessible (e.g., read/write) by both the host processor and the parallel processing unit 1102. For example, the I/O unit 1104 may be configured to access the buffer in a system memory connected to the interconnect 1122 via memory requests transmitted over the interconnect 1122. In an embodiment, the host processor writes the command stream to the buffer and then transmits a pointer to the start of the command stream to the parallel processing unit 1102. The front-end unit 1106 receives pointers to one or more command streams. The front-end unit 1106 manages the one or more streams, reading commands from the streams and forwarding commands to the various units of the parallel processing unit 1102.

The front-end unit 1106 is coupled to a scheduler unit 1108 that configures the various general processing cluster 1116 modules to process tasks defined by the one or more streams. The scheduler unit 1108 is configured to track state information related to the various tasks managed by the scheduler unit 1108. The state may indicate which general processing cluster 1116 a task is assigned to, whether the task is active or inactive, a priority level associated with the task, and so forth. The scheduler unit 1108 manages the execution of a plurality of tasks on the one or more general processing cluster 1116 modules.

The scheduler unit 1108 is coupled to a work distribution unit 1110 that is configured to dispatch tasks for execution on the general processing cluster 1116 modules. The work distribution unit 1110 may track a number of scheduled tasks received from the scheduler unit 1108. In an embodiment, the work distribution unit 1110 manages a pending task pool and an active task pool for each of the general processing cluster 1116 modules. The pending task pool may comprise a number of slots (e.g., 32 slots) that contain tasks assigned to be processed by a particular general processing cluster 1116. The active task pool may comprise a number of slots (e.g., 4 slots) for tasks that are actively being processed by the general processing cluster 1116 modules. As a general processing cluster 111600 finishes the execution of a task, that task is evicted from the active task pool for the general processing cluster 1116 and one of the other tasks from the pending task pool is selected and scheduled for execution on the general processing cluster 1116. If an active task has been idle on the general processing cluster 1116, such as while waiting for a data dependency to be resolved, then the active task may be evicted from the general processing cluster 1116 and returned to the pending task pool while another task in the pending task pool is selected and scheduled for execution on the general processing cluster 1116.

The work distribution unit 1110 communicates with the one or more general processing cluster 1116 modules via crossbar 1114. The crossbar 1114 is an interconnect network that couples many of the units of the parallel processing unit 1102 to other units of the parallel processing unit 1102. For example, the crossbar 1114 may be configured to couple the work distribution unit 1110 to a particular general processing cluster 1116. Although not shown explicitly, one or more other units of the parallel processing unit 1102 may also be connected to the crossbar 1114 via the hub 1112.

The tasks are managed by the scheduler unit 1108 and dispatched to a general processing cluster 1116 by the work distribution unit 1110. The general processing cluster 1116 is configured to process the task and generate results. The results may be consumed by other tasks within the general processing cluster 1116, routed to a different general processing cluster 1116 via the crossbar 1114, or stored in the memory 1124. The results can be written to the memory 1124 via the memory partition unit 1118 modules, which implement a memory interface for reading and writing data to/from the memory 1124. The results can be transmitted to another parallel processing unit 1102 or CPU via the NVLink 1120. In an embodiment, the parallel processing unit 1102 includes a number U of memory partition unit 1118 modules that is equal to the number of separate and distinct memory 1124 devices coupled to the parallel processing unit 1102.

In an embodiment, a host processor executes a driver kernel that implements an application programming interface (API) that enables one or more applications executing on the host processor to schedule operations for execution on the parallel processing unit 1102. In an embodiment, multiple compute applications are simultaneously executed by the parallel processing unit 1102 and the parallel processing unit 1102 provides isolation, quality of service (QOS), and independent address spaces for the multiple compute applications. An application may generate instructions (e.g., API calls) that cause the driver kernel to generate one or more tasks for execution by the parallel processing unit 1102. The driver kernel outputs tasks to one or more streams being processed by the parallel processing unit 1102. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory.

LISTING OF DRAWING ELEMENTS

102 lane receiver
104 lane receiver
106 receiver clock
108 driver chain
110 driver
112 driver
114 optical drop port
116 data sampler
202 lane transmitter
204 transmitter clock
206 optical fiber
208 clock distribution wire
210 mode control logic
302 lane receiver

502 lane receiver
504 lane receiver
506 lane receiver
508 lane receiver
510 receiver clock
602 clock distribution wire
702 lane receiver
704 lane receiver
706 receiver clock
708 differential phase generator
902 lane receiver
904 lane receiver
906 receiver clock
908 dummy load
910 IQ phase generator
1002 clock distribution wire
1004 clock distribution wire
1006 clock distribution wire
1008 clock distribution wire
1102 parallel processing unit
1104 I/O unit
1106 front-end unit
1108 scheduler unit
1110 work distribution unit
1112 hub
1114 crossbar
1116 general processing cluster
1118 memory partition unit
1120 NVLink
1122 interconnect
1124 memory Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A dense wave division multiplex (DWDM) receiver comprising:
   a plurality of receiver lanes;
   logic to apply a clock signal received on a variable one of the receiver lanes to lock a frequency of an injection locked oscillator (ILO) of a clock distribution network; and
   wherein one or more of the receiver lanes are configured to receive data signals and to generate resonance on the clock distribution network.

2. The DWDM receiver of claim 1, further comprising logic to selectively enable and disable the resonance generated by the receiver lanes configured to receive the data signals.

3. The DWDM receiver of claim 1, further comprising logic to selectively exclude the data signals from the receiver lanes configured to receive the data signals from being applied to the clock distribution network.

4. The DWDM receiver of claim 1, further configured to apply resonant signals from the clock distribution network to data samplers of the receiver lanes configured to receive the data signals.

5. The DWDM receiver of claim 1, the receiver lanes further comprising differential outputs to the clock distribution network.

6. The DWDM receiver of claim 1, the receiver lanes further comprising In-phase (I) and Quadrature-phase (Q) outputs to the clock distribution network.

7. The DWDM receiver of claim 1, the receiver lanes configured to enable a 1:9 injection ratio for the ILO.

8. The DWDM receiver of claim 1, the receiver lanes configured to enable a 1:4 injection ratio for the ILO.

9. A transceiver comprising:
   a transmitter comprising a plurality of transmitter lanes;
   a receiver comprising:
      a plurality of receiver lanes;
      logic to apply a clock signal forwarded from a variable one of the receiver lanes to lock a frequency of an injection locked oscillator (ILO) of a clock distribution network; and
      logic to selectively enable one or more of the receiver lanes to generate resonance on the clock distribution network.

10. The transceiver of claim 9, wherein the transmitter is a dense wave division multiplex (DWDM) transmitter and the receiver is a DWDM receiver.

11. The transceiver of claim 9, further comprising logic to selectively configure one or more of the receiver lanes to exclude received signals from reaching the clock distribution network.

12. The transceiver of claim 9, wherein the clock distribution network is coupled to clock data sampling circuits of one or more of the receiver lanes.

13. The transceiver of claim 9, wherein one or more of the receiver lanes comprises a differential output to the clock distribution network.

14. The transceiver of claim 9, wherein one or more of the receiver lanes comprises an In-phase (I) and Quadrature-phase (Q) output to the clock distribution network.

15. The transceiver of claim 9, further comprising logic to configure an injection ratio of the ILO.

16. The transceiver of claim 15, wherein the ILO is configured with a 1:9 injection ratio.

17. The transceiver of claim 15, wherein the ILO is configured with a 1:4 injection ratio.

18. An optical receiver comprising:
   a plurality of receiver lanes;
   logic to apply a clock signal received on a variable one of the receiver lanes to lock a frequency of an injection locked oscillator (ILO) of a clock distribution network; and
   logic to set an injection ratio of the ILO by selectively enabling and disabling individual ones of the receiver lanes to generate resonance on the clock distribution network.

19. The optical receiver of claim 18, wherein one or more of the receiver lanes comprises a differential output to the clock distribution network.

20. The optical receiver of claim 18, wherein one or more of the receiver lanes comprises an In-phase (I) and Quadrature-phase (Q) output to the clock distribution network.

* * * * *